United States Patent
Charling (10) Patent No.: US 11,721,204 B2
(45) Date of Patent: *Aug. 8, 2023

(54) SYSTEM AND METHOD FOR MANAGING DATA OF AN IRRIGATION SYSTEM

(71) Applicant: Lindsay Corporation, Omaha, NE (US)

(72) Inventor: Kurtis Arlan Charling, Elkhorn, NE (US)

(73) Assignee: LINDSAY CORPORATION, Omaha, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/747,188

(22) Filed: May 18, 2022

(65) Prior Publication Data

US 2022/0277646 A1    Sep. 1, 2022

Related U.S. Application Data

(63) Continuation of application No. 17/097,358, filed on Nov. 13, 2020, now Pat. No. 11,367,344.

(51) Int. Cl.
  *G08C 25/00* (2006.01)
  *G05B 19/042* (2006.01)
  *H04B 17/318* (2015.01)
  *A01G 25/16* (2006.01)
  (Continued)

(52) U.S. Cl.
  CPC ............ *G08C 25/00* (2013.01); *A01G 25/16* (2013.01); *G05B 19/042* (2013.01); *G08C 17/02* (2013.01); *H04B 17/318* (2015.01); *A01G 25/092* (2013.01); *G05B 2219/2625* (2013.01)

(58) Field of Classification Search
  CPC ........ G08C 25/00; G08C 17/02; A01G 25/16; G05B 19/042; G05B 19/0426
  See application file for complete search history.

(56) References Cited

U.S. PATENT DOCUMENTS

| 8,787,223 | B2 | 7/2014 | Watson et al. |
| 10,862,536 | B2 | 12/2020 | Moeller et al. |
| 11,031,814 | B2 | 6/2021 | Moeller et al. |

(Continued)

FOREIGN PATENT DOCUMENTS

CN    111480554 A    8/2020

OTHER PUBLICATIONS

International Search Report and Written Opinion dated Feb. 21, 2022 in related PCT application PCT/US2021/058533, 11 pages.

*Primary Examiner* — Vernal U Brown
(74) *Attorney, Agent, or Firm* — Hovey Williams LLP (57) ABSTRACT

A data management system for an irrigation system and methods of controlling operations thereof are provided. The data management system directs data captured at a plurality of sensors on the irrigation system to a remote device. The data management system comprises a communication bus and a plurality of communications. The communication bus extends along the irrigation system. The plurality of communication systems are positioned on the irrigation system and are connected to the communication bus. Each of the communication systems is configured to receive signals representative of the data from one of the sensors and to transmit signals representative of the data, via wireless communication, to the remote device.

20 Claims, 3 Drawing Sheets

(51) Int. Cl.
*G08C 17/02* (2006.01)
*A01G 25/09* (2006.01)

(56) References Cited

U.S. PATENT DOCUMENTS

| | | |
|---|---|---|
| 11,071,264 B2 | 7/2021 | Moeller |
| 11,367,344 B2 * | 6/2022 | Charling .............. G05B 19/042 |
| 2002/0107582 A1 | 8/2002 | Pollak et al. |

* cited by examiner

SYSTEM AND METHOD FOR MANAGING DATA OF AN IRRIGATION SYSTEM

RELATED APPLICATIONS

The present application is a continuation application that claims the priority benefit of co-pending U.S. patent application Ser. No. 17/097,358, filed on Nov. 13, 2020, and entitled "SYSTEM AND METHOD FOR MANAGING DATA OF AN IRRIGATION SYSTEM", which is hereby incorporated by reference in its entirety herein.

BACKGROUND

Irrigation systems often include sensors for detecting information about a field or crops therein. The data captured by the sensors is helpful for making irrigation decisions such as when and how much to water the crops. Current solutions for transmitting the data includes using a data bus connecting the sensors to a centralized, base unit for data transmission to a remote device. The data bus is often a limiting factor with respect to an amount of data that can be passed to the base unit and is a point of transmission failure.

The background discussion is intended to provide information related to the present invention which is not necessarily prior art.

SUMMARY

The present invention solves the above-described problems and other problems by providing a data management system, an irrigation system, and methods of controlling operations thereof that improve the transmission of data and enable edge computing architecture.

A data management system constructed according to an embodiment of the present invention directs data captured at a plurality of sensors on an irrigation system to a remote device. The data management system comprises a communication bus and a plurality of communication systems. The communication bus extends along the irrigation system, and the communication systems are positioned on the irrigation system and connected to the communication bus.

Each of the communication systems is configured to receive signals representative of the data from one of the sensors and to transmit signals representative of the data, via wireless communication, to the remote device. Connecting the communication systems to the communication bus enables redundant communication protocols for ensuring data is transmitted and received. Further, communication via the bus and wireless communication enables a larger volume of data to be captured at the irrigation system and transmitted. This improves the accuracy and insights that may be determined via cloud computing using the larger volume of data.

A data management system constructed according to another embodiment of the invention comprises a communication bus, a first communication system, and a second communication system. The communication bus extends along the irrigation system. The first communication system is positioned on the irrigation system and is configured to receive signals representative of captured data from a first sensor; determine whether a signal strength from a remote device at the first communication system is above a threshold; transmit signals representative of the captured data from the first sensor, via wireless communication, to the remote device when the signal strength at the first communication system is above the threshold; and transmit signals representative of the captured data from the first sensor via the communication bus when the signal strength at the first communication system is below the threshold.

The second communication system is also positioned on the irrigation system and is configured to receive signals representative of captured data from a second sensor; determine whether a signal strength of the remote device at the second communication system is above a threshold; receive signals representative of the captured data from the first sensor, via the communication bus, from the first communication system; and transmit signals representative of the captured data from the first sensor and signals representative of the captured data from the second sensor, via wireless communication, to the remote device when the signal strength at the second communication system is above the threshold. The second communication system's configuration for sending data from the first communication system via the communication bus ensures transmission of data captured at both sensors when the first communication has a poor wireless signal. This increases the fidelity of the data captured at the irrigation system and enables real-time processing of data captured at both sensors.

A computer-implemented method of the invention directs data captured by a plurality of sensors on an irrigation system to a remote device. The method broadly comprises receiving, via communication systems of a plurality of tower boxes, signals representative of the data captured by the sensors; transmitting, via a communication bus to which the communication systems are connected, signals representative of the data to the communication system of one or more of the tower boxes that detect a signal strength from the remote device above a threshold; and transmitting, via wireless communication from the communication system of one of the tower boxes, signals representative of the data to the remote device.

An irrigation system constructed according to an embodiment of the present invention comprises a plurality of mobile support towers, a plurality of structural supports, a fluid-carrying conduit, water emitters, a plurality of sensors, a communication bus, and a plurality of tower boxes. The mobile towers are configured to move across a field. The structural supports extend between the mobile support towers, and the fluid-carrying conduit is supported above the field by the structural supports. The water emitters are coupled with the fluid-carrying conduit. The sensors are positioned along the structural supports, and each sensor is configured to capture data associated with irrigating the field. The communication bus extends along the structural supports, and the tower boxes are also positioned along the structural supports. Each tower box includes a communication system connected to the communication bus and is configured to receive signals representative of the data from one of the plurality of sensors, and transmit signals representative of the data, via wireless communication, to a remote device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
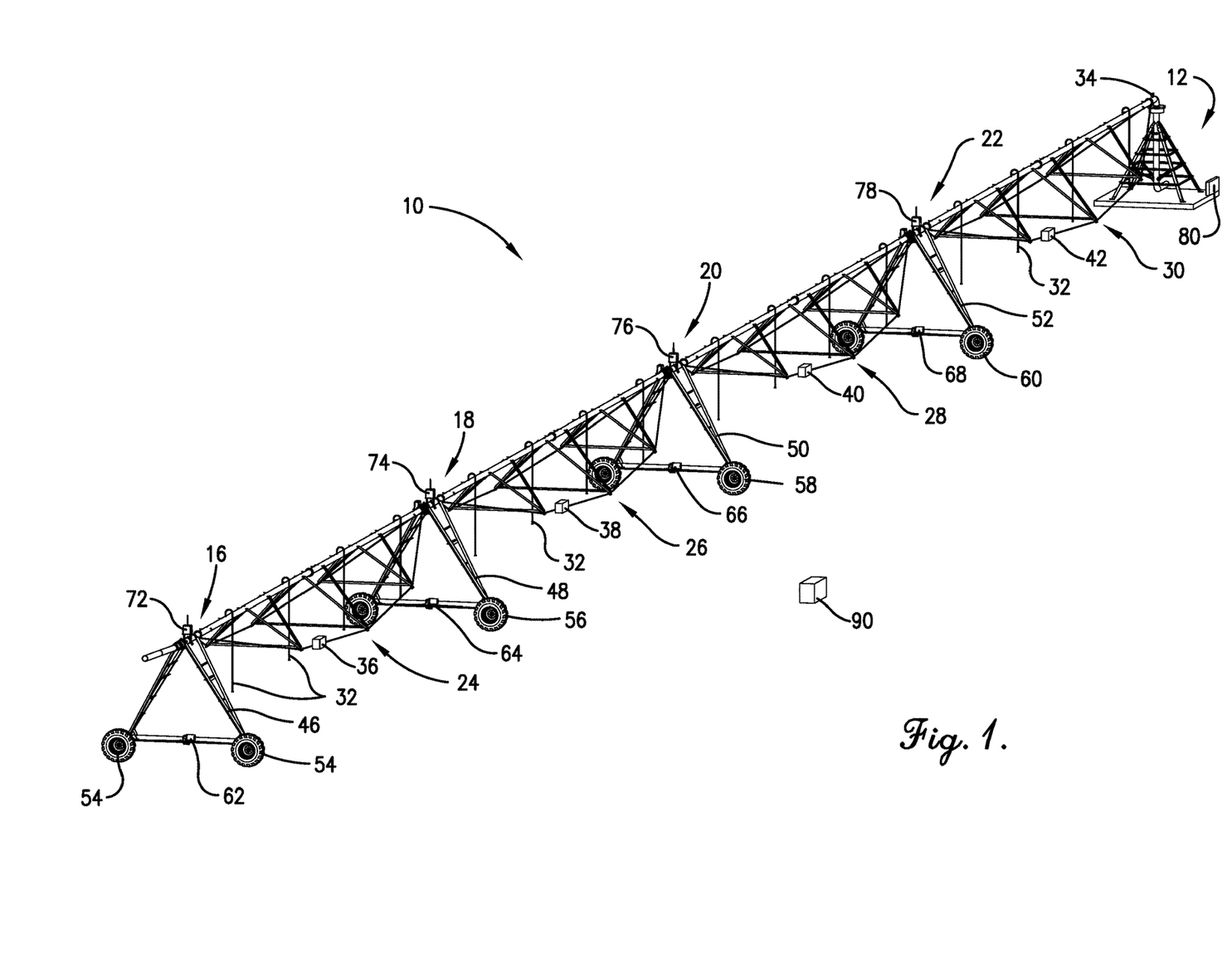
FIG. 1 is a perspective view of an exemplary irrigation system with which principles of the present invention may be implemented.

Turning to FIG. 1, an irrigation system 10 constructed in accordance with an embodiment of the invention is illustrated. The illustrated irrigation system 10 is a pivot irrigation system, but can be any other irrigation system, such as a lateral move irrigation system. The irrigation system 10 may have access to a hydrant, well, water tank, or other source 12 of water and may also be in fluid communication with a tank or other source of agricultural products to inject fertilizers, pesticides and/or other chemicals into the water for application during irrigation.

Figure 2:
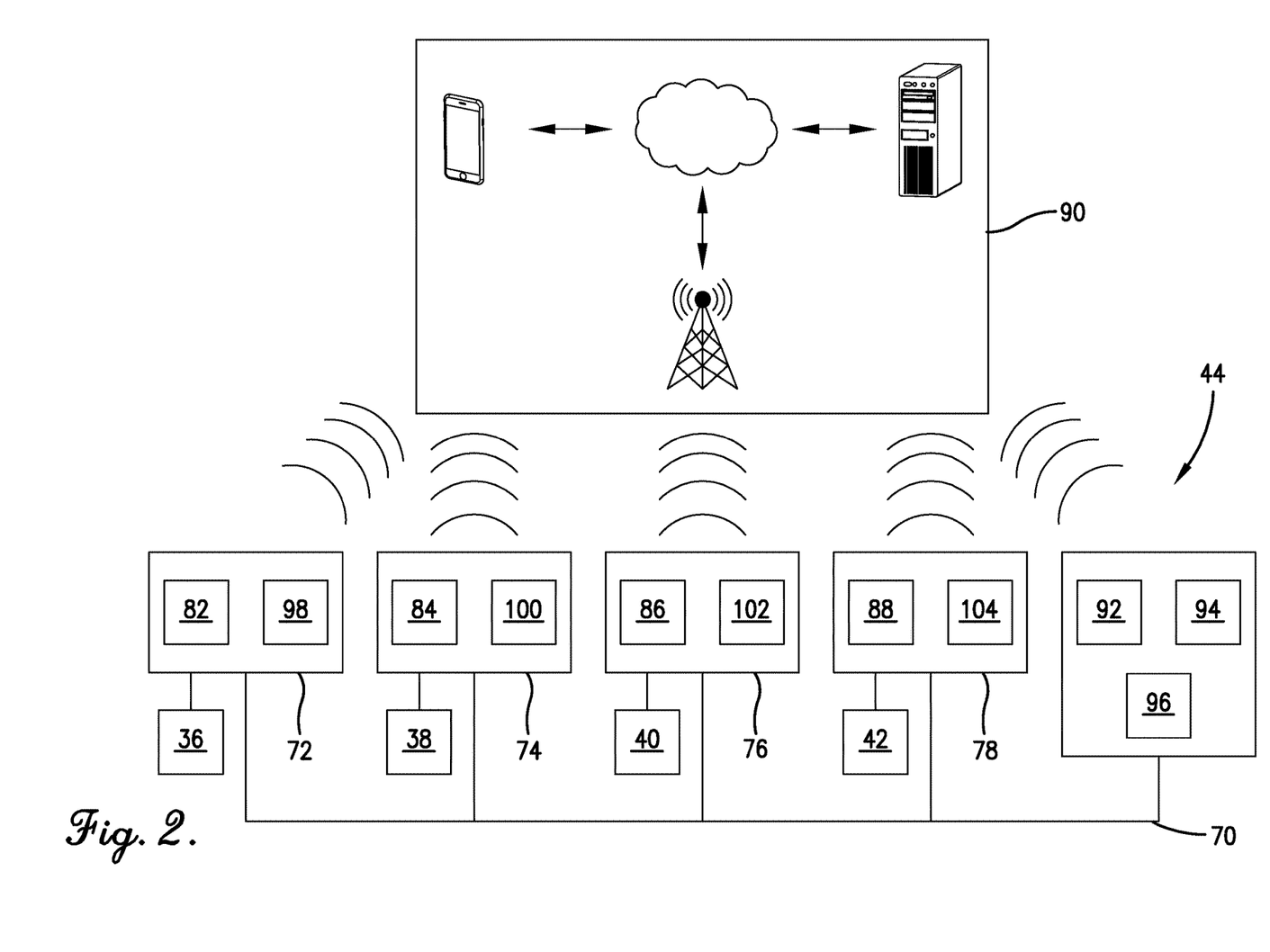
FIG. 2 is a block diagram depicting selected components of a data management system of the irrigation system of FIG. 1 and in communication with one or more remote devices.

The irrigation system 10 may comprise a number of spaced-apart mobile towers 16, 18, 20, 22, a fluid-distribution conduit 14 in fluid communication with the water source 12 and supported by the towers 16, 18, 20, 22 above a field, a plurality of structural supports, such as truss sections 24, 26, 28, 30 or other supports, to form a number of interconnected spans that help support the conduit 14, a plurality of fluid emitters 32 that are in fluid communication with the conduit 14, one or more valves 34 for controlling flow of fluids to the emitters 32, one or more sensors 36, 38, 40, 42 for capturing data, and a data management system 44 (depicted in FIG. 2).

The mobile towers 16, 18, 20, 22 support the conduit 14 and carry the conduit 14 and emitters 32 across the field. Each mobile tower 16, 18, 20, 22, includes a frame 46, 48, 50, 52 for supporting a portion of the conduit 14 and wheels 54, 56, 58, 60 rotatably attached to the frame 46, 48, 50, 52. One or more of the towers 16, 18, 20, 22 may include a motor 62, 64, 66, 68 for driving the wheels 54, 56, 58, 60 of its respective tower 16, 18, 20, 22.

The conduit 14 spans across the irrigation system 10 and carries water and/or other fluids to the emitters 32. The conduit 14 may comprise piping, one or more hoses, or the like. Water and/or other fluids may travel from the water source 12 to the conduit 14, which directs them to the emitters 32.

The fluid emitters 32 apply the water and/or other fluids transported by the conduit 14 to the crops and/or soil beneath the conduit 14. The fluid emitters 32 are spaced along the truss sections 24, 26, 28, 30 and may include a plurality of sprayer heads, sprinkler drops, spray guns, drop nozzles, valves, and/or other devices.

The one or more valves 34 control flow of water and/or other fluids through the emitters 32. The valves 34 may be controllable via one or more actuators, such as pneumatic actuator, hydraulic actuators, mechanical actuators, solenoid-type actuators, or the like. The valves 34 may be binary, in that they only shut on or off, and/or the valves 34 may adjust a flow rate of the water and/or other fluids flowing through the conduit 14 and/or the emitters 32. The irrigation system 10 may comprise only one valve 34 that controls the flow of water and/or other fluids to/through the conduit 14. The irrigation system 10 may alternatively or additionally comprise a plurality of valves 34 for such control. For example, a valve 34 may be in fluid communication with each emitter 32 so that the valve 34 controls the flow of water and/or other fluids through its corresponding emitter 32.

The sensors 36, 38, 40, 42 are configured to capture data related to the field, climate, weather, soil, crops, positioning, orientation, or the like. The sensors 36, 38, 40, 42 may comprise image-capturing devices, such as a camera, infrared sensors, such as thermal cameras or other multispectral image-capturing devices, or the like. The sensors 36, 38, 40, 42 may be attached to, for example, one of the truss sections 24, 26, 28, 30.

Turning to FIG. 2, the data management system 44 is configured to direct or manage data captured by the sensors 36, 38, 40, 42. The data management system 44 may comprise a communication bus 70, a plurality of tower boxes 72, 74, 76, 78, and a control system 80. The communication bus 70 is operable to receive and pass signals among and between the tower boxes 72, 74, 76, 78 and/or the control system 80. The communication bus 70 may comprise one or more fiber optic cables, one or more conductive cables, and/or the like that extend along the length of the irrigation system 10.

The tower boxes 72, 74, 76, 78 may be positioned on the mobile towers 16, 18, 20, 22, the truss sections 24, 26, 28, 30, and/or other parts of the irrigation system 10. The tower boxes 72, 74, 76, 78 may house portions of the communication bus 70 and include communication systems 82, 84, 86, 88 that generally allow communication with systems or devices external to their respective tower boxes 72, 74, 76, 78. The communication systems 82, 84, 86, 88 may include signal or data transmitting and receiving circuits, such as antennas, amplifiers, filters, mixers, oscillators, digital signal processors (DSPs), transceivers, modules, and the like. The communication systems 82, 84, 86, 88 may establish communication wirelessly by utilizing RF signals and/or data that comply with communication standards such as cellular 2G, 3G, 4G, 5G, or LTE, WiFi, WiMAX, Bluetooth®, BLE, or combinations thereof.

The communication systems 82, 84, 86, 88 may be configured to receive signals representative of data captured by one of more of the sensors 36, 38, 40, 42, transmit signals representative of the data via the communication bus 70 to other tower boxes 72, 74, 76, 78 and/or the control system 80, and/or transmit signals representative of the data via wireless communication to one or more remote devices 90. As used herein, "wireless communication" means the transmission or reception of an electromagnetic signal without the use of a physical medium, such as a cable, wire, fiber optic cable, or the like. "Wired communication" means the transmission or reception of signals with the use of a physical medium, such as a cable, wire, fiber optic cable, or the like. The remote devices 90 may comprise a Wi-Fi router, a cellular tower, a user device (such as a cell phone, smart phone, tablet, laptop, computer, or the like), a remote server, and/or any other device operable for connecting to, or connected to, the internet and/or the cloud.

In some embodiments, the tower boxes 72, 74, 76, 78 may be associated with one or more of the sensors 36, 38, 40, 42, and their communication systems 82, 84, 86, 88 may be configured to receive data captured by their respective sensors 36, 38, 40, 42. Each tower box 72, 74, 76, 78 may be associated with any number of sensors without departing from the scope of the present invention. The communication systems 82, 84, 86, 88 may be in wired and/or wireless communication with their associated sensors 36, 38, 40, 42.

The communication systems 82, 84, 86, 88 may be configured to determine a strength of a signal from one or more of the remote devices 90, or otherwise determine connectivity to one or more remote devices 90. The signal strength may be a power received at the respective communication systems 82, 84, 86, 88, such as the power as expressed in decibel-microvolts per meter, decibels above a milliwatt, or the like.

Each of the communication systems 82, 84, 86, 88 may be configured to transmit, via wireless communication, the data received from its associated sensor 36, 38, 40, 42 to one or more of the remote devices 90 when it detects a strength of a signal from one or more remote devices 90 above the threshold, or otherwise has determined it has a connection to one or more of the remote devices 90. For example, communication system 82 may receive data from its associated sensor 36, determine that the strength of the signal from one or more of the remote devices 90 received at the communication system 82 is above the threshold (or otherwise has a connection to one or more of the remote devices 90), and transmit the data to one or more of the remote devices 90 via wireless communication.

Each of the communication systems 82, 84, 86, 88 may also be configured to transmit the data received from its associated sensor 36, 38, 40, 42 via the communication bus 70 to one or more of the other communication systems 82, 84, 86, 88 and/or the control system 80 when it detects the signal strength of the one or more remote devices 90 is below the threshold, or otherwise has determined it does not have a connection to one or more of the remote devices 90. For example, communication system 82 may receive data from its associated sensor 36, determine that the signal strength of one or more of the remote devices 90 at the communication system 82 is below the threshold (or does not have a connection to one or more of the remote devices 90), and transmit the data via the communication bus 70 to one or more of the other communication systems 84, 86, 88 and/or the control system 80. One or more of the other communication systems 84, 86, 88 and/or the control system 80 may then transmit the data from the sensor 36 associated with communication system 82 via wireless communication to one or more of the remote devices 90 if the other communication system 84, 86, 88 and/or the control system 80 detect signal strengths above the threshold or are otherwise connected to one or more of the remote devices 90. To extend the above example, communication system 84 may be configured to receive the data captured by sensor 36 via the communication bus 70 from the communication system 82, determine that the signal strength of one or more of the remote devices 90 at the communication system 84 is above the threshold (or otherwise has a connection to one or more of the remote devices 90), and transmit the data to one or more of the remote devices 90 via wireless communication.

In some embodiments, the threshold related to signal strengths may be relative. The communication systems 82, 84, 86, 88 may be configured to compare their detected signal strengths with the signal strengths detected at other communication systems 82, 84, 86, 88. For example, one or more of the communication systems 82, 84, 86, 88 with the lowest detected signal strengths may transmit their data (from their associated sensors 36, 38, 40, 42) via the communication bus so that one or more of the communication systems 82, 84, 86, 88 detecting higher signal strengths transmit the data wirelessly to the remote device 90.

Figure 3:
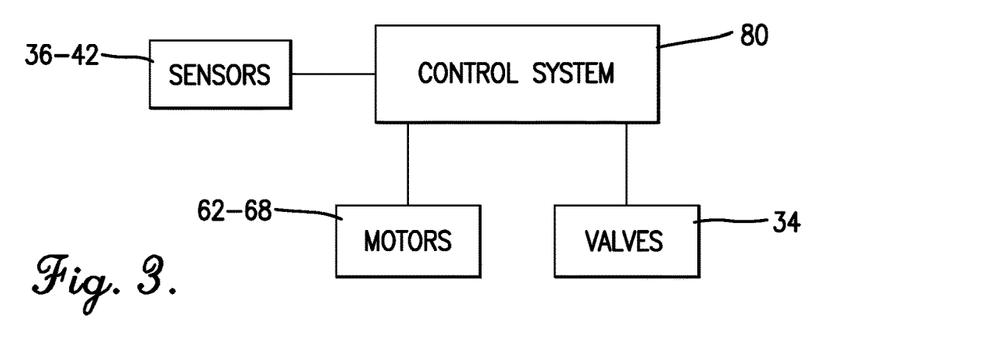
FIG. 3 is a block diagram depicting selected components of a control system of the irrigation system of FIG. 1.

The control system 80 is configured to control operations of the irrigation system 10 and may comprise a communication element 92, a memory element 94, and a processing element 96. The communication element 92 generally allows communication with systems or devices external to the control system 80, such as the communication systems 82, 84, 86, 88 of the tower boxes 72, 74, 76, 78 (via the communication bus 70) and one or more of the remote devices 90 (via wireless communication). The communication element 92 may include signal or data transmitting and receiving circuits, such as antennas, amplifiers, filters, mixers, oscillators, digital signal processors (DSPs), and the like. The communication element 92 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 92 may be in communication with the processing element 96 and the memory element 94.

The memory element 94 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 94 may be embedded in, or packaged in the same package as, the processing element 96. The memory element 94 may include, or may constitute, a "computer-readable medium". The memory element 94 may store the instructions, code, code segments, software, firmware, programs, applications, apps, services, daemons, or the like that are executed by the processing element 96.

The processing element 96 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 96 may generally execute, process, or run instructions, code, code segments, software, firmware, programs, applications, apps, processes, services, daemons, or the like. The processing element 96 may also include hardware components such as finite-state machines, sequential and combinational logic, and other electronic circuits that can perform the functions necessary for the operation of the current invention. The processing element 96 may be in communication with the other electronic components through serial or parallel links that include address busses, data busses, control lines, and the like.

For example, the processing element 96 of the control system 80 may be in communication with one or more of the valves 34, one or more of the sensors 36, 38, 40, 42, and/or one or more of the motors 62, 64, 66, 68 as depicted in FIG. 3. The processing element 96 may be in communication with the above components via the communication element 92 and/or direct wiring. The processing element 96 of the control system 80 may be configured to send and/or receive information to and/or from the above components. The processing element 96 of the control system 80 may also be configured to send and/or receive commands to and/or from one or more of the remote devices 90.

In some embodiments, the communication systems 82, 84, 86, 88 and/or the control system 80 may be configured to receive, via wireless communication, signals representative of messages and/or instructions from one or more of the remote devices 90. If the control system 80 does not have a strong signal from or a connection to one of the remote devices 90, one or more of the communication systems 82, 84, 86, 88 may be configured to receive the messages and/or instructions and then transmit the messages and/or the instructions to the control system 80 via the communication bus 70. The control system 80 may then implement the instructions, such as activating and/or deactivating one or more of the motors 62, 64, 66, 68, adjusting the valve 34, or the like.

In some embodiments, one or more of the remote devices 90 may comprise a remote server, computing device, or the like configured to process the data captured by the sensors 36, 38, 40, 42. For example, the remote devices 90 may compile the data into datasets and detect trends in the data and/or datasets. In some embodiments, the processing element 96 of the control system 80 may be configured to perform some of the processing for at least a portion of the data captured by the sensors 36, 38, 40, 42, such as compiling the data into datasets and/or detecting trends in the data. The processing element 96 may also be configured to adjust operations of the irrigation system 10 based on the data and/or datasets. In some embodiments, the tower boxes 72, 74, 76, 78 may further include processing elements 98, 100, 102, 104 configured to process portions of the data captured by the sensors 36, 38, 40, 42, as depicted in FIG. 2. This enables edge computing at the tower boxes 72, 74, 76, 78 for processing and using increasing amounts of data captured by the sensors 36, 38, 40, 42 on the irrigation system 10. It also increases a maximum number of sensors that may be placed on the irrigation system 10. The communication systems 82, 84, 86, 88 and/or the control system 80 may be configured to transmit datasets and/or detected trends to one or more of the remote devices 90.

Figure 4:
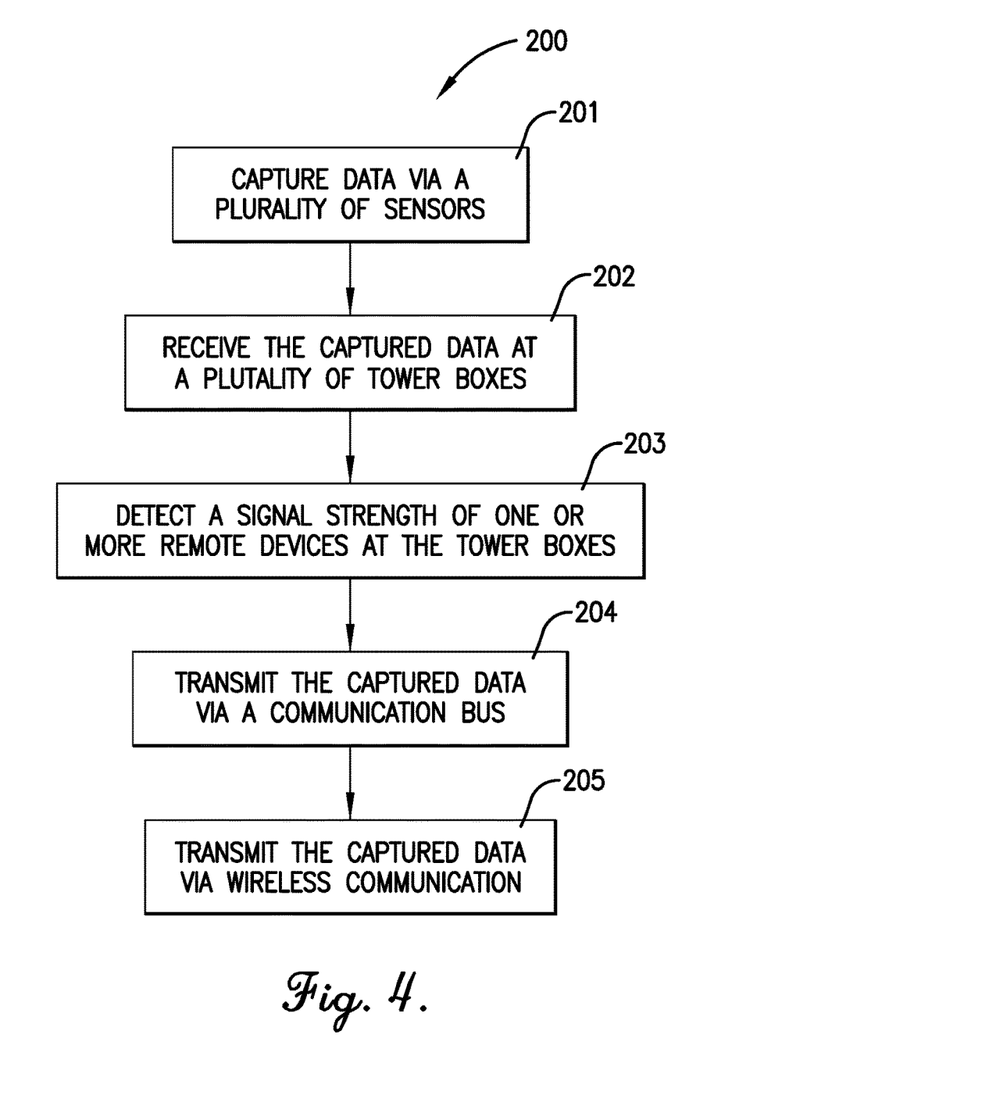
FIG. 4 is a flowchart depicting exemplary steps of a method according to an embodiment of the present invention.

The flow chart of FIG. 4 depicts the steps of an exemplary method 200 of controlling operations of a data management system. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved. In addition, some steps may be optional.

The method 200 is described below, for ease of reference, as being executed by exemplary devices and components introduced with the embodiments illustrated in FIGS. 1-3. The steps of the method 200 may be performed by the control system 80 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 201, data related to a field, climate, weather, soil, crops, positioning, orientation, or the like may be captured by a plurality of sensors. The data may include images, measurements (such as temperature, humidity, moisture, distance, volume of water, or the like), videos, or the like. The sensors may be positioned on the irrigation system, such as on structural supports, mobile support towers, a conduit, fluid emitters, etc.

Referring to step 202, data captured by the sensors may be received at a plurality of tower boxes. The data may be received via communication systems of the tower boxes. The data may be relayed to the communication systems from the sensors via wired and/or wireless communication. Each of the tower boxes may be associated with one or more of the sensors and configured to receive the captured data directly from its associated sensor. In some embodiments, this step may include processing the data via processing elements of the tower boxes and/or the control system. This step may include compiling the data into datasets and/or detecting trends in the data via the processing elements of the tower boxes and/or the control system.

Referring to step 203, a signal strength of one or more of the remote devices may be detected at one or more of the communication systems and/or a control system of the irrigation system. In some embodiments, the signal strength may be detected at each of the communication systems and the control system. This step may include determining, via one or more of the communication systems, whether the detected signal strength at one or more of the communications systems is above or below a threshold. This step may also include determining any remote device connectivity issues at one or more of the communication systems.

Referring to step 204, the data at one or more of the communication systems that detected a signal strength below the threshold is transmitted to one or more of the other communications via the communication bus. For example, if one of the communication systems detects a signal strength below a threshold at its location or otherwise has connectivity issues, then the communication system may transmit the data from its associated sensor to one or more of the other communication systems via the communication bus. This step may include transmitting the data at the control system via the communication bus. This step may also include transmitting the data to the control system via the communication bus from one or more of the communication systems that detected a signal strength below the threshold. In some embodiments, the threshold may be relative to the signal strengths detected at other communication systems. For example, the data from a number of the communication systems with the lowest detected signal strengths may be transmitted via the communication bus.

Referring to step 205, the data is transmitted to one or more of the remote devices via wireless communication from one or more of the communication systems of the tower boxes and/or the control system. The data may be transmitted via the communication systems that detect a signal strength (of the remote devices) at their respective locations that is above a threshold. The data captured by the associated sensors may be transmitted as well as the data received via the communication bus from communication systems associated with other sensors. In some embodiments, the threshold may be relative to the signal strengths detected at other communication systems. For example, the data from a number of the communication systems with the highest detected signal strengths may be transmitted via wireless communication.

The method 200 may include additional, less, or alternate steps and/or device(s), including those discussed elsewhere herein. Further, the steps discussed herein may be performed automatically without any involvement from a user. The method 200 may also include receiving processed data, datasets, and/or instructions based on the data and/or datasets, via the control system and/or one or more of the communication systems. The method 200 may further include a step of adjusting operations of the irrigation system, via the control system, based on the data and/or datasets.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of directing data associated with an irrigation system to a remote device, the method comprising:
   capturing data via a sensor;
   receiving the data via a first communication system positioned on the irrigation system and in communication with the sensor;
   determining, via the first communication system, that a signal strength from a remote device is below a threshold;
   transmitting, via the first communication system, a signal representative of the data to a second communication system positioned on the irrigation system through a communication bus extending along the irrigation system when the signal strength is below the threshold; and
   transmitting a signal representative of the data, via the second communication system, to the remote device.

2. The method of claim 1, further comprising—
   determining, via the second communication system, whether a signal strength from the remote device is below a threshold;
   transmitting, via the second communication system, a signal representative of the data to a third communication system through the communication bus when the signal strength is below the threshold; and
   transmitting a signal representative of the data, via the third communication system, to the remote device.

3. The method of claim 2, wherein the second communication system is configured to transmit the signal representative of the data to the remote device via wireless communication.

4. The method of claim 1, further comprising controlling operation of the irrigation system via a control system.

5. The method of claim 4, further comprising transmitting signals representative of the data from the first communication system and the second communication system to the control system via the communication bus.

6. The method of claim 5, further comprising transmitting, via the control system, a signal representative of the data to the remote device.

7. The method of claim 4, further comprising—
   receiving, via the first communication system, a signal representative of a message for the control system from the remote device; and
   transmitting, via the first communication system, a signal representative of the message through the communication bus to the control system.

8. The method of claim 4, further comprising compiling, via the control system, the data to form a dataset.

9. The method of claim 8, further comprising transmitting, via the control system, a signal representative of the dataset to the remote device.

10. The method of claim 1, further comprising—
    compiling, via a processing element of the first communication system, the data to form a dataset; and
    transmitting, via the first communication system, a signal representative of the dataset to the remote device.

11. A computer-implemented method of directing data captured by a plurality of sensors on an irrigation system to a remote device, the computer-implemented method comprising:

receiving, via communication systems of a plurality of tower boxes, signals representative of the data captured by the plurality of sensors;

transmitting, via a communication bus to which the communication systems are connected, signals representative of the data to the communication system of one or more of the plurality of tower boxes that detect a signal strength from the remote device above a threshold; and transmitting, via wireless communication from the communication system of the one or more of the plurality of tower boxes, signals representative of the data to the remote device.

12. The computer-implemented method of claim 11, further comprising compiling, via processing elements of the plurality of tower boxes, the data into datasets.

13. The computer-implemented method of claim 11, further comprising adjusting, via a control system of the irrigation system, operation of the irrigation system based on the data.

14. The computer-implemented method of claim 11, further comprising— receiving, via wireless communication from the communication system of one or more of the plurality of tower boxes, signals representative of instructions from the remote device for a particular tower box of the plurality of tower boxes; and transmitting, via the communication bus, signals representative of the instructions to the particular tower box of the plurality of tower boxes.

15. A method of directing data associated with an irrigation system to a remote device, the method comprising:

capturing data via a sensor;

receiving the data via a first communication system positioned on the irrigation system and in communication with the sensor;

determining, via the first communication system, whether a signal strength from a remote device is above a threshold;

transmitting a signal representative of the data, via the first communication system, to the remote device when the signal strength at the first communication system is above the threshold;

transmitting a signal representative of the data, via the first communication system, to a second communication system positioned on the irrigation system through a communication bus extending along the irrigation system when the signal strength is below the threshold;

determining, via the second communication system, whether a signal strength from the remote device at the second communication system is above a threshold; and transmitting a signal representative of the data, via the second communication system, to the remote device when the signal strength at the second communication system is above the threshold.

16. The method of claim 15, further comprising transmitting, via the second communication system, a signal representative of the data to a third communication system through the communication bus when the signal strength of the remote device at the second communication system is below the threshold.

17. The method of claim 16, further comprising transmitting, via the third communication system, a signal representative of the data to the remote device.

18. The method of claim 15, wherein the sensor is a first sensor, further comprising— capturing data via a second sensor in communication with the second communication system;

receiving the data via the second communication system;

determining, via the second communication system, that the signal strength from the remote device is above the threshold; and transmitting the data captured via the first sensor and the data captured via the second sensor to the remote device when the signal strength from the remote device is above the threshold.

19. The method of claim 18, further comprising— transmitting, via the second communication system, the data captured by the second sensor to the first communication system through the communication bus when the signal strength of the remote device at the second communication system is below the threshold; and transmitting, via the first communication system, the data captured by the second sensor to the remote device when the signal strength of the remote device at the first communication system is above the threshold.

20. The method of claim 18, further comprising— compiling the data captured by the first sensor via a processing element of the first communication system to form a first dataset;

compiling the data captured by the second sensor via a processing element of the second communication system to form a second dataset; and transmitting the first dataset and the second dataset, via at least one of the first communication system or the second communication system, to the remote device.

* * * * *